Figure 1:
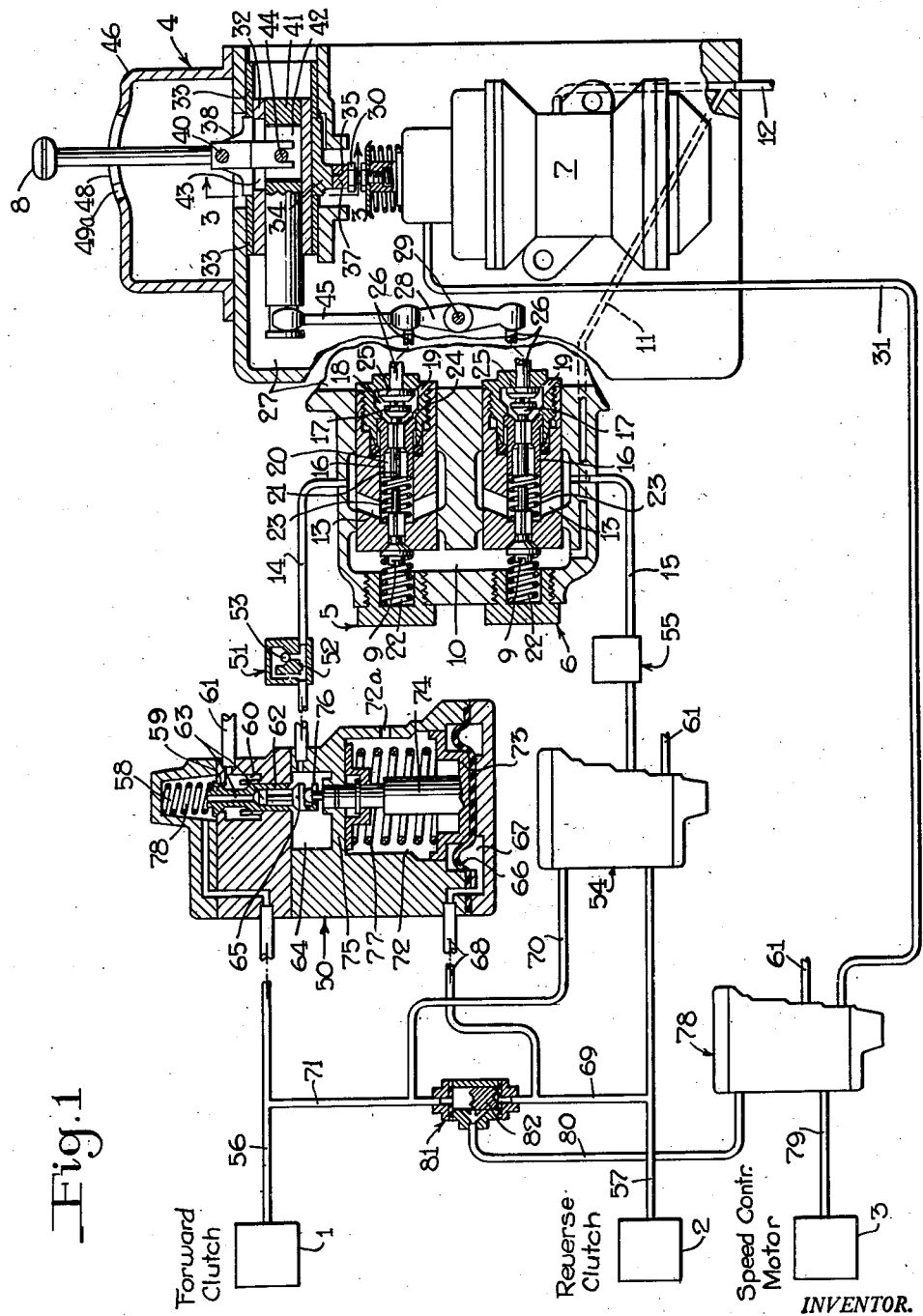

Dec. 25, 1951  R. R. STEVENS  2,580,367
CLUTCH AND SPEED CONTROL APPARATUS
Filed Dec. 1, 1948  2 SHEETS—SHEET 2

INVENTOR.
Roy R. Stevens
BY Frank E. Miller,
ATTORNEY

Patented Dec. 25, 1951

2,580,367

UNITED STATES PATENT OFFICE 2,580,367

CLUTCH AND SPEED CONTROL APPARATUS

Roy R. Stevens, Forest Hills, Pa., assignor to Westinghouse Air Brake Company, a corporation of Pennsylvania Application December 1, 1948, Serial No. 62,884

13 Claims. (Cl. 192—.098)

This invention relates to control apparatus and more particularly to the fluid pressure type for controlling speed of a prime mover and selective operation of clutches for reversing direction of operation of a member, such as a propeller, driven by said prime mover.

Where the prime mover on a ship is operative in one direction only it is customary to employ forward and reverse clutches to connect the prime mover to the propeller, the selective operation of said clutches providing for operation of said propeller and hence of the ship in either the forward or astern directions. To reverse the direction of operation of the propeller it is only necessary to disengage the one clutch and engage the other, as well known, but unless certain precautions are taken damage to the clutches and other parts of the power transmission is liable to occur. In other words, it is desirable that the prime mover and propeller be brought to a low speed, such as idling speed of the prime mover, before an operating clutch is disengaged and the other clutch is engaged, in order to minimize the possibility of damage. Moreover it may also be desirable to increase the power of or fuel supply to the prime mover slightly while engaging a clutch in order to minimize possibility of the engine stalling.

The principal object of the invention is therefore the provision of improved means for accomplishing the above results.

According to this object I provide means which is automatically operative, in response to reversing movement of an operator's clutch and speed control lever to reverse the direction of rotation of the propeller or other load being driven, to reduce the power of or fuel supply to the prime mover to a degree to permit reduction in speed of the prime mover to a chosen low speed, such as substantially idling, while maintaining the driving clutch engaged so that deceleration of the prime mover will also decelerate the load, and to then disengage the driving clutch and engage the other clutch and at the same time as initiating engagement of said other clutch to provide, if desired, a temporary slight increase in speed or power of the prime mover as required to avoid possibility of stalling thereof upon connecting the load thereto, and to prevent further increase in speed or power of the prime mover until after said other clutch is substantially fully engaged. By thus delaying engagement of a driving clutch and engagement of the other clutch until the speed of both the prime mover and driven load are reduced to a chosen load degree, and preventing any substantial increase in power or speed of the prime mover until after said other clutch is engaged to a chosen degree, such as substantially fully engaged, the possibility of damage to the clutches and other parts of the power transmission is minimized.

Another object of the invention is the provision of means which is automatically operative to prevent operation of a prime mover above idling speed with a clutch disengaged or engaged to less than a chosen degree, and to reduce the speed of the prime mover to idling in case of reduction in engagement of a clutch to less than a chosen degree, such as in case of failure of the clutch.

Other objects and advantages will become apparent from the following more detailed description of the invention.

Figure 2:
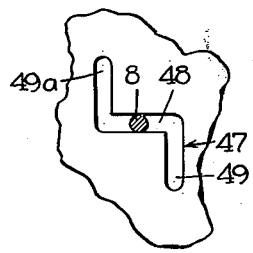
Figure 3:
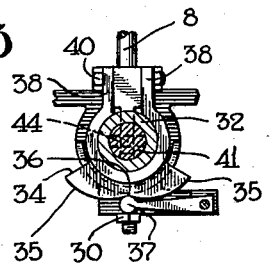
Figure 4:
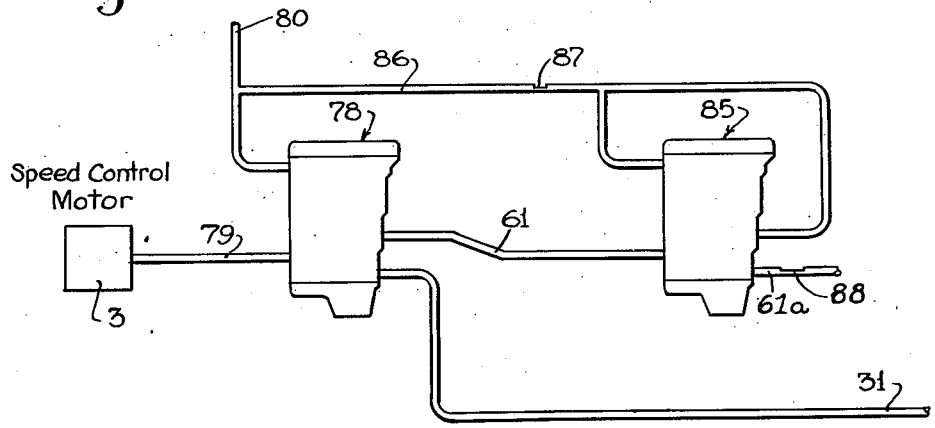

In the accompanying drawing; Fig. 1 is a diagrammatic view, partly in section and partly in outline, of a clutch and speed control apparatus embodying the invention; Fig. 2 is a partial plan view of an operator's control device employed in said apparatus; Fig. 3 is a sectional view taken on line 3—3 in said device; and Fig. 4 is a diagrammatic view of a modification of the invention.

*Description—Figs. 1 to 3*

As shown in Fig. 1 of the drawing, reference numerals 1 and 2 indicate, respectively, fluid pressure operable forward and reverse couplings or clutches arranged to connect a prime mover to a load to be driven such as the propeller of a ship. The prime mover and propeller are not shown in the drawing since such structures are so well known. Likewise the clutches 1 and 2 are not shown in detail, but they may be of any suitable type, such for example, as illustrated diagrammatically in U. S. Patent No. 2,420,856 issued to W. E. Brill et al. on May 20, 1947. The reference numeral 3 designates a motor operable by fluid under pressure to adjust the power or speed of the prime motor, as for example the fuel supply to a diesel engine, in proportion to the pressure of such fluid. The structure of this motor is not shown in the drawing since such structures are so well known, but if desired, reference may be made to U. S. Patent No. 2,383,277 issued to me on August 21, 1945, which illustrates a motor particularly adapted for this use.

An operator's control valve device 4 is provided for controlling supply of fluid under pressure to and its release from the clutches 1 and 2 for controlling engagement and disengagement thereof and also to and from the speed control motor for controlling operation thereof. The operator's control valve device 4 comprises a casing with which there is associated a forward clutch control valve device 5, a reverse clutch control valve device 6, a self-lapping speed regulating valve device 7, and an operator's control lever 8 for selectively controlling operation of the devices 5, 6 and 7.

The forward and reverse clutch control valve devices 5 and 6 are of identical structure each comprising a fluid pressure supply valve 9, both of which valves are mounted in a common chamber 10 connected by a passage 11 to a fluid pressure supply pipe adapted to be supplied with fluid at a desired pressure, such as one hundred pounds from any suitable source. The valve 9 is provided with a fluted stem extending through a bore in a partition wall into a chamber 13 which in the valve device 5 is connected to a forward pipe 14 while in the valve device 6 said chamber is open to a reverse pipe 15, said valve being provided for controlling supply of fluid under pressure from chamber 10 to chamber 13 and thence to the respective pipe. A plunger 16 is slidably mounted in the casing in coaxial relation to valve 9 and on the end opposite said valve is provided with a seat for engagement by a fluid pressure release valve 17 contained in a chamber 18 which is open to atmosphere through a passage 19 and a chamber 27 within the casing. The seat for engagement by valve 19 encircles a passageway 20 extending through plunger 16 and open at the opposite end of said plunger to chamber 13, whereby said valve is adapted to control communication between said chamber, and hence pipe 14 or 15, and atmosphere. The plunger 16 is provided with a solid central portion 21 for engaging the stem of valve 9 to effect unseating thereof. A spring 22 acts on valve 9 to urge it to its seat, while a spring 23 acts on plunger to urge it out of contact with the stem of said valve into contact with a shoulder 24 in the casing. In chamber 18 there is a plunger 25 arranged to engage valve 17 for seating same, said plunger having a guide stem 26 extending into the casing chamber 27. The stem 26 in the forward and reverse clutch control valve devices 5 and 6 are arranged in parallel, spaced apart relation for engagement by opposite ends of a lever 28 which at its center is fulcrumed on a fixed pin 29.

Upon turning of lever 28 in a counterclockwise direction the valve 17 in the forward clutch control valve device 5 will be seated against plunger 16 followed by movement of said plunger against spring 23 into engagement with the stem of the respective supply valve 9 which latter valve will then be unseated, whereby the pipe 14 will be disconnected from atmosphere by closure of said valve 17 and opened to the fluid pressure supply pipe 12 by opening of said valve 9, so that said pipe 14 will become charged with fluid at the pressure (100 pounds) present in pipe 12. When the lever 28 is operated as just described the respective end thereof is moved away from stem 26 of the reverse control valve device 6 so that therein the valve 9 remains seated by spring 22, the plunger 16 is held in contact with shoulder 24 by spring 23, and the release valve 17 remains open opening the respective pipe 15 to atmosphere.

Upon return of lever 28 to the position in which it is shown in the drawing, spring 22 in the forward clutch control valve device 5 seats the respective valve 9 and spring 23 returns plunger 16 therein into contact with shoulder 24 whereupon pressure of fluid in pipe 14 unseats valve 17 to permit release of such fluid pressure, the parts of the reverse control valve device 6 remaining in the position opening pipe 15 to atmosphere.

If the lever 28 is rocked in a clockwise direction the reverse clutch control valve device 6 will operate to open the reverse clutch pipe 15 to the fluid pressure supply pipe 12, while upon return of said lever to the position in which it is shown in the drawing said pipe will be opened to atmosphere to release fluid under pressure therefrom, the forward clutch control valve device 5 maintaining pipe 14 open to atmosphere during such operation as will be clear from above description.

The self-lapping speed regulating valve device 7 may be of any suitable structure embodying a control member or plunger 30 operative upon downward movement from a normal position, such as it is shown in the drawing, to supply fluid from the supply pipe 12 to a speed control pipe 31 at a pressure dependent upon the degree of such movement, and to open said pipe to atmosphere in said normal position.

A rock shaft 32 disposed above plunger 30 is journaled in the casing in two spaced apart bearings 33. A cam 34 is mounted on shaft 32 between the bearings 33 and has two like and oppositely arranged cam surfaces 35 joined by a recess 36 for engaging and receiving, respectively, one side of a power transmitting member 37 the opposite side of which is in contact with plunger 30. With the cam 34 in a neutral position for recess 36 receiving the end of member 37 the control member 30 of the self-lapping speed control valve device 7 will assume its normal position to open pipe 31 to atmosphere. Rotation of rock shaft 32 and thereby of the cam element 34 in either direction from neutral position will displace the control member 30 downwardly for actuating the device 7 to supply fluid from pipe 12 to the speed control pipe 31 at a pressure proportional to the extent of such movement.

Opposite the cam recess 36, the cam 34 has two spaced apart parallel arms 38 between which extends one end of the operator's control lever 8. A bolt 40 extends through the arms 38 and lever 9 thereby providing for rocking movement of said lever lengthwise of the rock shaft 32. Movement of lever 8 circumferentially of rock shaft 32 will actuate cam element 34 for controlling the speed control valve device 7.

The rock shaft 32 has an axial bore in which is slidably mounted a plunger 41 having a slot 42 aligned with a relatively long opening 43 through one side of rock shaft 32. The inner end of the operator's control lever 8 extends through the opening 43 into the slot 42 and within said slot is connected to plunger 41 by a pin 44 secured in said plunger. Rocking of lever 8 in either direction from a neutral position in which it is shown, lengthwise of the rock shaft 32 on bolt 40 will therefore move plunger 41 lengthwise within the rock shaft 32.

The lever 28 for operating the forward and reverse clutch control valve devices 5 and 6 is provided with an extension 45 the end of which is operatively connected to plunger 41 for movement therewith for selectively actuating said valve devices upon movement of said plunger in either one direction or the opposite direction by lever 8.

The operator's control device further comprises a cover 46 having a slot 47 in which the operator's control lever is arranged to move. The slot 47 has a central portion 48 providing for movement of the lever 8 lengthwise of rock shaft 32 for controlling the forward and reverse clutch control valve devices 5 and 6 while retaining said rock shaft in neutral position against movement. At the opposite ends of the portion 48 of slot 47, said portion opens to oppositely extending portions 49, 49a providing for movement of said lever to rock shaft 32 in either direction from neutral position without effect upon position of plunger 41.

The pipe 14 is connected to a coupling or clutch interlock valve device 50 through a device 51 including a choke 52 for restricting flow of fluid under pressure in the direction from device 50 through said pipe and a communication of greater flow capacity than and by-passing said choke and containing a check valve 53 for permitting a more rapid rate of flow of fluid under pressure in the opposite direction. The pipe 15 is connected to a coupling or clutch interlock valve device 54 through a device 55, said devices being like the devices 50 and 51, respectively. These clutch control valve devices 50, 54 are also connected respectively to the forward end reverse clutches 1 and 2 by pipes 56 and 57.

Each of the clutch interlock valve devices 50, 54 comprises a casing having a chamber 58 open to the respective pipe 56 or 57 and containing a valve 59 for controlling communication between said chamber and a chamber 60 which is open to atmosphere through a pipe 61. The valve 59 is provided on one end of a plunger 62 extending through chamber 60 and slidably mounted in the casing for a portion of its length, said plunger and valve being provided with communicating axial openings 63 for connecting chamber 58 to a chamber 64 at the opposite end of the plunger. Around the opening 63 on the end of plunger exposed to chamber 64 is a valve seat arranged for cooperation with a valve 65 contained in said chamber for controlling communication between said chamber and chamber 58. The chambers 64 in the two clutch interlock valve devices 50, 54 are open, respectively, to pipes 14, 15.

Each of the interlock valve devices 50, 54 further comprises a flexible diaphragm 66 at one side of which is a pressure chamber 67. In the valve device 50 chamber 67 is open through pipes 68 and 69 to the reverse clutch pipe 57, while in valve device 54 said chamber is open through pipes 70 and 71 to the forward control pipe 56. At the opposite side of diaphragm 66 is a non-pressure chamber 72 open to atmosphere through a port 72a and containing a follower 73 engaging the diaphragm. The follower 73 has a stem 74 projecting therefrom through chamber 72 and a bore in a partition wall 75, separating said chamber from chamber 64, into the latter chamber wherein the end of said stem is connected by a hook 76 to the valve 65 whereby said valve is movable with said stem. A control spring 77 contained in chamber 72 acts on the follower 73 and thereby the one side of diaphragm 66 with a chosen degree of force, for example such as to prevent movement of said diaphragm from the position in which it is shown in the drawing by fluid in chamber 67 at a pressure less than ten pounds. With the diaphragm 66 in the position shown in the drawing the valve 59 is adapted to be seated by a spring 78a and the valve 65 is adapted to be out of seating engagement with the end of plunger 62. When fluid at a pressure in excess of for example ten pounds is effective in chamber 67 the diaphragm 66 is adapted to deflect against spring 77 and seat valve 65 against plunger 62 and actuate said plunger to unseat valve 59.

The numeral 78 designates a coupling or clutch-speed interlock valve device arranged to control communication between the speed control pipe 31 and a pipe 79 connected to the speed adjusting motor 3. The construction of the interlock valve device 78 is identical to that of the clutch interlock valve devices 50, 54 except that the spring 77 therein exerts a force against the diaphragm 66 such as to prevent deflection thereof to seat the valve 65 and unseat the valve 59 by fluid in the chamber 67 at a pressure less than for instance sixty pounds. In the valve device 78, the valve chamber 58 is open to pipe 31, the valve chamber 60 is open to pipe 79 and the diaphragm chamber 67 is open to a pipe 80 connected to the side outlet of a double check valve device 81 comprising a double check valve 82 arranged to be operated by fluid under pressure from either one of pipes 69 or 71, when the other pipe is vented, to open pipe 80 to the one of said two pipes supplied with fluid under pressure and to close communication between pipe 80 and the vented one of said two pipes.

*Operation—Figs. 1 to 3*

In operation, assume that pipe 12 is supplied with fluid at the desired pressure, such as one hundred pounds. Further assume that handle 8 of the operator's control device 4 is in neutral position in which it is shown in Figs. 1 and 2 of the drawing. With handle 8 thus positioned the speed control pipe 31 is open to atmosphere through the speed regulating device 7, and the forward and reverse clutch control pipes 14, 15 are open to atmosphere through the forward and reverse clutch control valve devices 5 and 6, respectively. Assuming that the parts of the clutch interlock valve devices 50, 54 are in the position, in which the parts of device 50 are shown in the drawing, pipe 56 and thereby the forward clutch 1 will be vented to pipe 14 through the open valve 65 in the interlock valve device 50, and pipe 57 and the reverse clutch 2 will likewise be vented to pipe 15 through the open valve 65 in the interlock valve device 54 whereby both clutches 1 and 2 will be disengaged. With pipe 56 vented diaphragm chamber 67 in the interlock valve device 54 will be vented thereto through pipes 70 and 71 to permit the parts of said valve devices to assume the position just mentioned, while with pipe 57 vented diaphragm chamber 67 in the interlock valve device 50 will be vented through pipes 68 and 69 to permit the parts of interlock valve device 50 to also assume the position just mentioned. With pipes 71 and 69 vented, pipe 80 and thereby diaphragm chamber 67 in the clutch-speed interlock valve device 78 will be vented past the double check valve 82 and one or the other of pipes 71, 69. The parts of the clutch-speed interlock valve device 78 will therefore assume the position in which the valve 65 therein is unseated to open pipe 79 and the speed control motor 3 to atmosphere to permit adjustment of the power or speed of an operating prime mover to idling.

Now assuming that the apparatus is associated with a ship's propulsion system and that it is desired to move the ship forward, the operator will move control lever 8 from neutral position, in which it is shown in Figs. 1 and 2, to the right-hand end of the portion 48 of slot 47 which will actuate plunger 41 and thereby lever 28 to seat valve 17 and open valve 9 in the forward clutch control valve device 5 while the parts of the reverse clutch control valve device 6 remain in the position in which they are shown in the drawing. With the forward clutch control valve device 5 thus operated fluid under pressure from the supply pipe 12 will flow to pipe 14 and past the check valve 53 therein to valve chamber 64 in the clutch interlock valve device 50, and thence past the open valve 65 to valve chamber 58 and through pipe 56 to the forward clutch 1 to actuate same to connect the prime mover to the propeller to start the ship forward.

Fluid under pressure supplied to pipe 56 to engage the forward clutch 1 will also flow through pipes 71 and 70 to diaphragm chamber 67 in the clutch interlock valve device 54 and when ten pounds pressure is obtained therein on diaphragm 66, said diaphragm will deflect to close the valve 65 and open the valve 56 for reasons which will be later brought out.

Fluid under pressure from pipe 71 will also flow past the double check valve 82 to pipe 80 and diaphragm chamber 67 in the clutch-speed interlock valve device 78 and when such pressure is increased to the sixty pounds the diaphragm 66 therein will deflect to close the valve 65 and open the valve 59, respectively, for thereby disconnecting pipe 79 and the speed control motor 3 from atmosphere by way of pipe 61 and for opening pipe 79 and said motor to the speed control pipe 31. Movement of the operator's control lever 8 from the right-hand end of portion 48 of slot 47 into the portion 49 will actuate the speed regulating device 7 to supply fluid to pipe 31 at a pressure corresponding to the extent of such movement, and with pipe 31 connected to pipe 79, such fluid pressure will become effective in the speed control motor 3 to accelerate or increase the power of the prime mover to a corresponding degree to move the ship forward.

In starting the ship forward the lever 8 may be moved from neutral position first to the right-hand end of the portion 48 of slot 47 to engage the clutch 1 and then into the portion 49 of said slot to increase the speed of the prime mover, or it may be moved without hesitation from neutral position to the desired speed position in portion 49 of the slot and the same result will be obtained since, although fluid under pressure will immediately become effective in pipe 31 in case of the latter movement of said lever, the clutch-speed interlock valve device 78 will prevent such fluid becoming effective in the speed control motor 3 to accelerate the prime mover until after the pressure in the forward clutch 1 is increased to the degree (sixty pounds) to cause substantially full engagement thereof, whereupon the clutch-speed interlock valve device 78 will operate to open pipe 31 to pipe 79 to permit acceleration of the prime mover.

With the operator's control lever 8 in neutral position the ship may be started astern by movement of said lever to the left-hand end of portion 48 of slot 47 and then into portion 49a in the same manner as for starting the ship forward.

Now assume that the forward clutch 1 is engaged and the speed control motor 3 is adjusted to cause forward movement of the ship and that it is desired to reverse the direction of movement as promptly as possible. To accomplish this the operator will move lever 8 from whatever position it may be in in the portion 49 of slot 47 back to and through the portion 47 and into the portion 49a to a position corresponding to the desired speed or power of the prime mover for astern movement of the ship. In response to this movement, the speed regulating valve device 7 will operate to temporarily reduce slightly the pressure in the speed control pipe 31 but promptly reestablish such pressure. The forward clutch control valve device 5 will operate to cut off supply of fluid under pressure to pipe 14 and to open said pipe to atmosphere, while the reverse clutch control valve device 6 will be operated to open the reverse pipe 15 to the fluid pressure supply pipe 12. Fluid under pressure will therefore be supplied to pipe 15 and past the check valve 53 to valve chamber 64 in the clutch interlock valve device 54 wherein it will be temporarily prevented from further flow by the respective valve 65 which is seated by pressure of fluid from the forward clutch pipe 56 acting in the respective diaphragm chamber 67.

As fluid under pressure is released from pipe 14 as just mentioned, fluid under pressure will be released from the forward clutch 1 through pipe 56, past the open valve 65 in the interlock valve device 50 and through choke 52 in device 51 to pipe 14 for releasing the forward clutch 1, and also with such release fluid under pressure will be released from diaphragm chamber 67 in the clutch-speed interlock valve device 78 and the clutch interlock valve device 54. The spring 77 in the clutch-speed interlock valve device 78 will operate when the pressure in the forward clutch pipe 14 becomes reduced to sixty pounds to disconnect pipe 79 from the speed control pipe 31 and to connect it to pipe 61 whereby the fluid under pressure will be promptly released from the speed control motor 3 for causing operation thereof to reduce the supply of power or fuel to the prime mover to permit deceleration thereof to a low and substantially idling speed. With the clutch 1 still engaged deceleration of the prime mover will therefore also correspondingly slow down the propeller. The choke 52 so limits the rate of release of fluid under pressure from the forward clutch 1 that the speed of the prime mover and propeller will thus become reduced to a chosen low degree, such as idling, by the time the pressure of fluid in the forward clutch 1 becomes reduced to a chosen low degree, such as ten pounds, at which said clutch is substantially released. When the pressure of fluid in the forward clutch 1, and hence in diaphragm chamber 67 of the clutch interlock valve device 54 becomes thus reduced to ten pounds, spring 77 in said interlock valve device will actuate diaphragm 75 therein to permit closure of valve 59 and opening of valve 65 therein. The closing of valve 59 in the clutch interlock valve device 54 disconnects the reverse clutch 2 from atmosphere via pipe 61 and connects it to the reverse pipe 15 which now is supplied with fluid under pressure by the reverse clutch control valve device 6. Fluid under pressure therefore will then flow from pipe 15 to pipe 57 and to the reverse clutch 2 to engage same. As pressure of fluid is thus supplied to pipe 57 it will become effective through pipe 69 on the lower end of the double check valve 82. With the pressure on the opposite end of the double check valve 82 reduced through pipe 56 to a lower degree, the pressure of fluid from pipe 69 will move the double check valve to its upper position to disconnect pipe 80 from pipe 71 and to open pipe 80 to pipe 69, whereupon pressure of fluid effective in the latter pipe and in reverse clutch 2 will also become effective in diaphragm chamber 67 of the clutch-speed interlock valve device 78. When the pressure of fluid in the reverse clutch 2 and in chamber 67 of the clutch-speed interlock valve device 78 then becomes increased to sixty pounds, corresponding to a desired degree of engagement such as full engagement of the reverse clutch 2, the clutch-speed interlock valve device 78 will operate to seat valve 65 and open valve 59 therein, for thereby disconnecting the speed control motor from atmosphere and connecting it to the speed control pipe 31 which is supplied with fluid at a pressure corresponding to the position of lever 8 in portion 49a of slot 47. The speed control motor 3 will thereby be adjusted to increase the power or accelerate the prime mover and propeller to the degree selected by the position of the operator's control lever in the portion 49a of slot 47.

In the operation of the apparatus to reverse the direction of movement of the ship from forward to astern as just described, the clutch interlock valve device 50 will operate in response to substantially ten pounds pressure in the reverse clutch engaging pipe 57 to close the respective valve 65 and open the respective valve 59 whereby any remaining fluid present in the forward clutch 1 will be promptly vented to atmosphere past the valve 59 and through the atmospheric pipe 61. With ten pounds pressure in either the forward clutch 1 or the reverse clutch 2, the clutch will be substantially released or ineffective, so that by quickly dissipating this pressure remaining in the forward clutch 1 at the time a like pressure becomes effective in the reverse clutch 2, the forward clutch will be substantially released before the reverse clutch starts to engage or become effective. Moreover this operation of the clutch interlock valve device 50 by pressure of fluid from the reverse clutch pipe 57 to quickly vent any fluid pressure still remaining in the forward clutch 1 also disconnects the forward clutch pipe 56 from the forward pipe 14 to prevent engagement of the forward clutch 1 until substantial complete release of the reverse clutch 2 in case the operator should move control lever 8 directly from the portion 49a of slot 47 to the portion 49 for effecting operation of apparatus to reverse the direction of movement of the ship from astern to ahead. The operation of the apparatus in response to such movement of the operator's control lever from the portion 49a to the portion 49 is the same as operation in response to movement of said lever from the portion 49 to the portion 49a of slot 47 and hence it is not considered necessary to describe it in detail.

It is however desired to briefly point out that when the lever 8 is moved from the portion 49 to the portion 49a of the slot 47 to effect operation of the apparatus to reverse direction of movement of the ship, that the clutch-speed interlock valve device 78 will promptly operate to cut off the supply of power or fuel to the prime mover to permit deceleration thereof and thereby of the propeller still connected to the prime mover by clutch 1. The release of clutch 1 is controlled by choke 52 which so retards such release as to permit the prime mover and propeller to reduce substantially to idling speed of the prime mover before the interlock valve device 54 operates to effect engagement of clutch 2 and whereupon the clutch interlock valve device 50 operates at substantially the same time to promptly effect complete release of clutch 1, the clutch-speed interlock valve device 78 then operating upon a chosen degree or substantially full engagement of clutch 2 to permit increase in power or acceleration of the prime mover and propeller to the selected speed. The operation of the apparatus is identical in reversing the direction of movement of the ship from reverse to forward. It will therefore be noted that upon operation of the apparatus to reverse direction of movement of a ship, the engaged clutch is held engaged to permit the prime mover to decelerate the propeller down to substantially idling speed of the prime mover whereupon the engaged clutch is promptly completely disengaged and the other clutch is engaged before the prime mover is accelerated thereby minimizing wear of and possibility of damage to the clutches and other parts of a power transmission system.

With either clutch 1 or 2 engaged, if it is desired to effect disengagement thereof without effecting engagement of the other clutch, this may be effected by returning the lever 8 to neutral position, whereby the respective forward or reverse clutch control valve device 5 or 6 will be operated to open the respective pipe 14 or 15, and thereby the respective clutch 1 or 2, to atmosphere for effecting disengagement thereof.

While the clutch 1 or 2 is engaged and the prime mover is driving the load if the clutch engaging pressure in pipe 56 or pipe 57 should for any reason reduce to below sixty pounds, it will be noted that the clutch-speed interlock valve device 78 will respond to such reduction and disconnect the speed control motor 3 from the speed control pipe 31 and vent fluid under pressure from said motor to atmosphere through the respective pipe 61 to thereby reduce the power and/or speed of the prime mover to cause idling thereof. This will not only call the operator's attention to the failure so that it may be corrected, but will also minimize unnecessary, damaging slipping of the clutch which otherwise might result.

*Description and operation—Fig. 4*

At the time of engaging either clutch, in the structure shown in Fig. 1 of the drawing, the prime mover will be operating at idling speed and power, as above described. In order to minimize the possibility of the prime mover becoming stalled at the time of engaging either clutch it may be desirable to increase slightly the power or speed of the prime mover and this may be accomplished by the modification of the invention shown in Fig. 4 of the drawing.

According to this modification, I add to the apparatus shown in Fig. 1, a booster interlock valve device 85 which structurally may be identical to the clutch-speed interlock valve device 78 except for the spring 77 employed in the device 85 which acts on the respective diaphragm 66 with a force to prevent deflection of said diaphragm with fluid in the chamber 67 at a pressure less than for example twenty pounds. Diaphragm chamber 67 in the interlock valve device 85 is open to pipe 80 through a pipe 86 in which there is disposed a choke 87, and pipe 61 from the clutch-speed interlock valve device 78 is connected to valve chamber 58 in the interlock valve device 85. In the interlock valve device 85 valve chamber 64 is open to pipe 86 at said valve device side of choke 87 and chamber 60 is open to atmosphere through a pipe 61a in which there may be arranged a choke 88.

In operation, when either clutch 1 or 2 is fully engaged, the engaging pressure of fluid in pipe 56 or 57 and thereby in pipe 80 and diaphragm chamber 67 of the clutch-speed interlock valve device 78 will position said device to open pipe 79 to the speed control pipe 31 to permit adjustment of the power or speed of the prime mover by the operator's control lever 8 in the same manner as in the structure shown in Fig. 1 and above described. Under this condition the same pressure will also be effective from pipe 80 through pipe 86 in diaphragm chamber 67 of the interlock valve device 85 and therein act to close the respective valve 65 and open the respective valve 56 whereby pipe 61 from the clutch-speed interlock valve device 78 will be open to atmosphere through pipe 61a.

When the lever 8 is moved to neutral position for releasing fluid under pressure from pipe 56 or pipe 57 to effect disengagement of the respective clutch 1 or 2, and for releasing fluid under pressure from pipe 31 for reducing the power or speed of the prime mover, the clutch-speed interlock valve device 78 will operate when the pressure in pipe 56 or 57 becomes reduced to sixty pounds to disconnect the speed control motor 3 from the speed control pipe 31 and open said motor to atmosphere by way of the respective pipe 61, the interlock valve device 85 and pipe 61a until the pressure in pipe 56 or 57 becomes reduced to twenty pounds, whereupon the interlock valve device 85 will operate to open pipe 61 to pipe 86. During the time the speed control motor 3 is open to atmosphere by way of pipe 61a, the pressure of fluid in said motor will become reduced sufficiently, such as to atmospheric pressure, to cause the engine speed or power to reduce to substantially idling or minimum, while upon subsequent operation of the interlock valve device 85 to open pipe 61 to pipe 86 there may be a slight momentary increase in pressure in motor 3 by fluid under pressure from pipe 56 or 57 which however will be quickly dissipated along with the venting of fluid under pressure from pipe 56 or 57 and have no material effect on engine power or speed.

Now let it be assumed that the prime mover is driving the ship forward and that the operator's control lever 8 is moved from its position in the portion 49 of slot 47 to a desired power or speed position in the portion 49a to effect reversal of the ship. In response to this movement pressure of fluid from the forward clutch 1 will be dissipated through the clutch interlock valve device 50 and choke 52 as above described, in response to which reduction the clutch-speed interlock valve device 78 will operate in the same manner as above described to vent fluid under pressure from the speed control motor 3 by way of the interlock valve device 85, pipe 61a and choke 88, and cause operation of said motor to reduce the power or speed of the prime mover substantially to idling. When the pressure of fluid in the forward clutch 1 becomes further reduced to twenty pounds the interlock valve device 85 will operate to connect the respective pipe 61 to pipe 86 following which the clutch interlock valve device 54 will operate, when the pressure in the forward clutch 1 becomes further reduced to ten pounds, to establish communication from the reverse pipe 15 to the reverse clutch 2 to initiate engagement of the reverse clutch 2. As fluid under pressure is thus supplied to pipe 57 and to the reverse clutch 2, the double check valve 82 will shift to open pipe 57 to pipe 80, so that as fluid under pressure becomes effective in the reverse clutch 2 it will also flow to pipe 80 and thence to the clutch-speed interlock valve device 78 and also through choke 87 to diaphragm chamber 67 and valve chamber 64 in the interlock valve device 85.

Fluid under pressure thus supplied to chamber 64 in the interlock valve device 85 will flow past the open valve 65 therein to the connected pipe 61 and thence through the clutch-speed interlock valve device 78 to the speed control motor 3 and actuate same to correspondingly increase the power or speed of the prime mover, it being noted that this will occur immediately in response to supply of fluid under pressure to initiate engagement of the reverse clutch 2 in order to prevent stalling of the prime mover incident to such engagement.

When the pressure of fluid obtained through choke 87 in diaphragm chamber 67 of the interlock valve device 85 from the reverse clutch engaging pipe 57 becomes increased to twenty pounds, said interlock valve device will be operated to disconnect the speed control motor 3 from pipe 86 and open it to atmosphere through pipe 61a thereby limiting the pressure of fluid obtained in the speed control motor 3, and hence the increase in power or speed of the prime mover at the time of engaging the reverse clutch, to a slight degree only sufficient to accomplish the desired end of preventing the prime mover from stalling.

When the pressure of fluid in the reverse clutch 2 and hence the pressure of fluid in pipe 80 and diaphragm chamber 67 of clutch-speed interlock valve device 78 subsequently becomes increased to sixty pounds, at which said clutch is substantially fully engaged, said valve device will respond thereto to open the speed control motor 3 to the speed control pipe 31 whereby said motor will be adjusted according to the position of the operator's control lever 8 in portion 49a of slot 47 to provide a corresponding output of power or speed of the prime mover.

In reversing the clutches as just described, it will be noted that choke 87 controls or restricts the rate of supply of fluid under pressure to diaphragm chamber 67 of the interlock valve device 85 and to the speed control motor 3, the flow capacity of said choke being such as to insure operating of the interlock valve device 85 to cut off the supply of fluid under pressure to the speed control motor 3 the instant such pressure is increased to the degree (twenty pounds) necessary to cause the desired increase in power or speed of the prime mover. Also in reversing the clutches, the pressure of fluid in the speed control motor 3 will be reduced to a chosen low degree, such as atmospheric pressure, between the time of response of the clutch speed interlock valve device 78 and of the booster interlock valve device 85 to reducing pressure of fluid in either the forward or reverse clutch control pipe 56 or 57 to effect disengagement of the respective clutch and between the time of response of the booster interlock valve device 85 and clutch interlock valve device 78 to increasing pressure of fluid in the other pipe 56 or 57 to effect engagement of the other clutch, although in both cases the pressure of fluid in the speed control motor 3 reduces through choke 88. The choke 88 has no effect upon the result, the only purpose being to sufficiently retard release of fluid under pressure from the speed control motor 3 under the above conditions to slightly slow down its rate of operation which occurs at substantially full engagement of the clutch.

The operation of the apparatus in response to movement of the operator's control lever from the portion 49a of the slot 47 to the portion 49, to effect reversal of the direction of ship movement from astern to ahead is substantially the same as above decribed for reversing ship movement from ahead to astern and need not therefore be described.

Summary

It will now be seen that I have provided an apparatus for controlling the speed of a prime mover and the selective operation of forward and reverse clutches to connect and disconnect said prime mover to and from a load to be driven which is automatically operative in response to reversing movement of an operator's control lever to prevent engagement of either clutch until after the other clutch is substantially disengaged, and in which neither clutch can be either engaged or disengaged with the prime mover and load operating at a speed exceeding a chosen low degree, such as idling, whereby possibility of excessive wear of and damage to the clutches or other parts of the associated power transmission is minimized. Moreover the apparatus may embody structure automatically operative in reversing clutches to provide a slight temporary boost in engine power or speed to prevent stalling of the prime mover while engaging either clutch. The speed or power of the prime mover cannot be increased unless the pressure of fluid for engaging the clutches can be increased above that required for operating the clutch-speed interlock valve device, corresponding to a chosen degree of engagement of the clutches, and if, while a clutch is engaged, the pressure of the clutch engaging fluid should for any reason become reduced to a slightly lower degree, the operation of the clutch-speed interlock valve device will reduce the power and speed of the prime mover to idling.

Having now described my invention what I claim as new and desire to secure by Letters Patent, is:

1. An apparatus for controlling operation of two individual coupling control means adapted to be operated by fluid only at and exceeding a chosen pressure for connecting a prime mover to drive a load and for also controlling a power control motor adapted to be operated by fluid under pressure for adjusting the speed of said prime mover in proportion to the pressure of such fluid, comprising in combination with said coupling control means and motor, a control device for selectively supplying fluid under pressure to operate either one of said coupling control means and for at the same time supplying fluid under pressure to operate said power control motor and for releasing fluid under pressure from the other coupling control means, coupling interlock means operable by fluid in one of said coupling control means when in excess of said chosen pressure for closing the fluid pressure supply communication from said control device to the other coupling control means other interlock means responsive to fluid at less than a chosen higher pressure for closing the fluid pressure supply communication from said control device to said power control means and for opening a fluid pressure release communication from said power control means, and means operable by fluid pressure in said two coupling control means to selectively subject said other interlock means to pressure of fluid in the one of said coupling control means which is at the higher pressure.

2. An apparatus for controlling operation of two individual coupling control means adapted to be operated by fluid only at and exceeding a chosen pressure for connecting a prime mover to drive a load and for also controlling a power control motor adapted to be operated by fluid under pressure for adjusting the speed of said prime mover in proportion to the pressure of such fluid, comprising in combination with said coupling control means and motor, two coupling control pipes one connected to each of said coupling control means, a speed control pipe, a control device for supplying fluid under pressure to either one of said coupling control pipes, while at the same time venting the other coupling control pipe and supplying fluid under pressure to said speed control pipe, coupling interlock means controlling communication between said coupling control pipes and the respective coupling control means operable by fluid at or exceeding said chosen pressure in either coupling control means to close communication between the other coupling control means and the respective pipe and open said other coupling control means to atmosphere and responsive to a reduction in such pressure to a degree below said chosen pressure to open said communication, and coupling speed interlock means controlling communication between said speed control pipe and said power control motor operative to open such communication in response to pressure of fluid exceeding a chosen higher degree in either one of said coupling control means and to close such communication and release fluid under pressure from said power control motor in response to a lower pressure of fluid in either one of said coupling control means.

3. An apparatus for controlling two individual couplings operable by fluid under pressure to provide a driving connection between a load and a prime mover to a degree proportional to the pressure of such fluid and operable upon release of such fluid under pressure to disconnect said load from said prime mover, and for also controlling a power control motor operable by fluid under pressure to adjust the speed of said prime mover in proportion to the pressure of such fluid, comprising in combination with said couplings and motor, two coupling control pipes one connected to each of said couplings, a speed control pipe for said power control motor, a control device for selectively supplying fluid under pressure to either one of said coupling control pipes while at the same time releasing fluid under pressure from the other coupling control pipe and supplying fluid under pressure to said speed control pipe, two coupling interlock valve devices, one controlling communication between each of said coupling control pipes and the respective coupling and responsive to pressure of fluid in the other coupling to open said communication when such pressure is in excess of a chosen degree and to close said communication and to vent fluid under pressure from the respective coupling when such pressure is of a lower degree, a coupling speed interlock valve device controlling communication between said speed control pipe and power control motor operable to open such communication in response to pressure of fluid in either of said couplings required to provide a chosen degree of engagement thereof and operable to close such communication and open said motor to atmosphere upon a reduction in pressure of the controlling fluid to a lower degree, and means for selectively opening said coupling speed interlock valve device to the one of said couplings supplied with fluid at higher pressure.

4. An apparatus for controlling two individual couplings operable by fluid under pressure to provide a driving connection between a load and a prime mover to a degree proportional to the pressure of such fluid and operable upon release of such fluid under pressure to disconnect said load from said prime mover and for also controlling a power control motor operable by fluid under pressure to adjust the speed of said prime mover in proportion to the pressure of such fluid, comprising in combination with said couplings and motor, a control device operable to selectively supply fluid under pressure to either one of said couplings and at the same time release fluid under pressure from the other coupling and supply fluid under pressure to operate said motor, means controlling the supply of fluid under pressure to and its release from each of said couplings operable upon operation of said control device to release fluid under pressure from either one of couplings, to delay the supply of fluid under pressure to the other coupling until the pressure of fluid in said one coupling is reduced to below a chosen pressure, and clutch speed interlock means operable in response to a chosen higher pressure of fluid in either one of said couplings to open said power control motor to said control device and operable in response to a lower pressure of fluid to open said motor to atmosphere.

5. An apparatus for controlling two fluid pressure operable couplings for individually transmitting power from a prime mover to a load in proportion to the pressure of such fluid comprising in combination with said couplings, a control device for selectively supplying fluid under pressure to operate either one of said couplings while releasing fluid under pressure from the other coupling, interlock means controlling the fluid pressure supply and release communication between said couplings and control device operable upon operation of said control device to supply fluid under pressure to operate either coupling to close said communication with the pressure of fluid in the other coupling in excess of a chosen degree and to open said communication at a lower pressure, and means arranged to restrict release of fluid under pressure through said communication from the respective coupling and providing for more rapid flow of fluid under pressure in the direction to the respective coupling.

6. An apparatus for controlling operation of a coupling operable by fluid under pressure to transmit power from a prime mover to drive a load in proportion to the pressure of such fluid and for also controlling a motor operable by fluid under pressure to increase the speed or power of said prime mover in proportion to the pressure of such fluid comprising in combination with said coupling, and motor, a control device for supplying fluid under pressure to and releasing fluid under pressure from said coupling and motor, interlock means controlled by pressure of fluid in said coupling for establishing a fluid pressure control communication between said control device and motor only when the pressure of the coupling fluid is in excess of a chosen degree, other interlock means also responsive to pressure of fluid in said coupling for establishing a fluid pressure supply communication to said motor only when the pressure of coupling fluid is less than a chosen lower degree, and means for limiting pressure of fluid in the last named communication.

7. An apparatus for controlling operation of a coupling operable by fluid under pressure to transmit power from a prime mover to drive a load in proportion to the pressure of such fluid and for also controlling a motor operable by fluid under pressure to increase the speed or power of said prime mover in proportion to the pressure of such fluid comprising in combination with said coupling and motor, a control device for supplying fluid under pressure to and releasing fluid under pressure from said coupling and motor, two fluid pressure controlled devices one responsive only to a pressure of fluid in excess of that required to provide substantially full effectiveness of said coupling to establish communication between said control device and motor and operative at a lower pressure to close said communication and establish another communication opening said motor to the other fluid pressure controlled device, said other fluid pressure controlled device being responsive only to pressure of fluid in excess of that required to initiate effectiveness of said coupling to open said other communication to atmosphere and operative at a lower pressure to supply fluid under pressure to said other communication, and means for rendering both of said fluid pressure controlled devices responsive to pressure of fluid supplied for operating said coupling means.

8. An apparatus for controlling operation of a coupling operable by fluid under pressure to transmit power from a prime mover to drive a load in proportion to the pressure of such fluid and for also controlling a motor operable by fluid under pressure to increase the speed or power of said prime mover in proportion to the pressure of such fluid comprising in combination with said coupling and motor, a control device for supplying fluid under pressure to and releasing fluid under pressure from said coupling and motor, two fluid pressure controlled devices one responsive only to a pressure of fluid in excess of that required to provide substantially full effectiveness of said coupling to establish communication between said control device and motor and operative at a lower pressure to close said communication and establish another communication opening said motor to the other fluid pressure controlled device, said other fluid pressure controlled device being responsive only to pressure of fluid in excess of that required to initiate effectiveness of said coupling to open said other communication to atmosphere and operative at a lower pressure to supply fluid under pressure to said other communication, means connecting both of said fluid pressure controlled devices to said coupling for rendering them responsive to fluid under pressure supplied to operate said coupling, and choke means in the connection between said coupling and said other fluid pressure controlled device for restricting supply of fluid under pressure to said other fluid pressure controlled device.

9. An apparatus for controlling operation of a coupling operable by fluid under pressure to transmit power from a prime mover to drive a load in proportion to the pressure of such fluid and for also controlling a motor operable by fluid under pressure to increase the speed or power of said prime mover in proportion to the pressure of such fluid comprising in combination with said coupling and motor, a control device for supplying fluid under pressure to and releasing fluid under pressure from said coupling and motor, two fluid pressure controlled devices one responsive only to a pressure of fluid in excess of that required to provide substantially full effectiveness of said coupling to establish communication between said control device and motor and operative at a lower pressure to close said communication and establish another communication opening said motor to the other fluid pressure controlled device, said other fluid pressure controlled device being responsive only to pressure of fluid in excess of that required to initiate effectiveness of said coupling to open said other communication to atmosphere and operative at a lower pressure to open said other communication to the fluid pressure supply and release communication to said coupling, means for rendering both of said fluid pressure controlled devices responsive to fluid under pressure in said supply and release communication, and choke means in the connection between said supply and release communication and said other fluid pressure controlled device for restricting flow of fluid under pressure to said other communication and to said other fluid pressure controlled device for controlling operation thereof.

10. An apparatus for controlling operation of a coupling operable by fluid under pressure to transmit power from a prime mover to drive a load in proportion to the pressure of such fluid and for also controlling a motor operable by fluid under pressure to increase the speed or power of said prime mover in proportion to the pressure of such fluid comprising in combination with said coupling and motor, a control device for supplying fluid under pressure to and releasing fluid under pressure from said coupling and motor, and interlock means arranged to be controlled by fluid under pressure supplied to operate said coupling to establish communication between said motor and control device only when the pressure of the coupling operating fluid is in excess of a chosen degree corresponding to substantially a full effectiveness of said coupling, and operable when the pressure of coupling operating fluid is less than a chosen lower degree effective upon initiating effectiveness of said coupling, to supply fluid to said motor from the supply to operate said coupling, and means including said interlock means arranged to limit to a chosen degree the pressure of fluid obtained in said motor by the last named supply thereto.

11. An apparatus for controlling two fluid pressure operable couplings for transmitting power from a prime mover to a load in proportion to the pressure of such fluid and for also controlling a motor operable by fluid under pressure to adjust the speed or power of said prime mover in proportion to the pressure of such fluid, comprising in combination with said couplings and motor, an operator's control device for selectively supplying fluid under pressure to operate either one of said couplings and for at the same time releasing fluid under pressure from the other coupling and supplying fluid under pressure to said motor, interlock means controlling communication between said control device and couplings operable by pressure of fluid in each coupling only when in excess of a chosen degree, corresponding to substantial complete ineffectiveness of the respective coupling, to establish communication between the other coupling and said control device, and other interlock means arranged to be controlled by pressure of fluid for operating either coupling for opening communication between said operator's control device and motor only when the pressure of fluid in the other coupling is in excess of a chosen degree, corresponding to substantially full effectiveness of the respective coupling, and also operable, only when both of said couplings are substantially ineffective upon operation of said control device to render either coupling effective, to supply fluid under pressure to said motor, and means for limiting to a chosen low degree the pressure of fluid obtained in said motor by the last named operation of said control device.

12. A control mechanism for a pair of fluid actuators and a third fluid actuator comprising valve means for selectively supplying fluid under pressure to either one of said pair of actuators and at the same time to said third actuator, interlock means for each of said pair of actuators controlled by pressure of fluid in the other of said pair of actuators for closing the fluid under pressure supply communication to and for opening the respective actuator to atmosphere except when the pressure of fluid in the other actuator is less than a chosen degree, and other interlock means for said third actuator controlled by the pressure of fluid in the one of said pair of actuators subject to the higher pressure of fluid for opening said third actuator to atmosphere except when said higher pressure is in excess of said chosen degree.

13. A control mechanism for a pair of fluid actuators and a third fluid actuator comprising valve means for selectively supplying fluid under pressure to either one of said pair of actuators and at the same time to said third actuator, interlock means for each of said pair of actuators controlled by pressure of fluid in the other of said pair of actuators for closing the fluid under pressure supply communication to and for opening the respective actuator to atmosphere except when the pressure of fluid in the other actuator is less than a chosen degree, and other interlock means for said third actuator controlled by the pressure of fluid in the one of said pair of actuators subject to the higher pressure of fluid for opening said third actuator to atmosphere when said higher pressure of fluid is between chosen high and low limits, and to said third actuator and to said higher pressure of fluid when, respectively, in excess of or less than said high or low limits.

ROY R. STEVENS.

REFERENCES CITED

The following references are of record in the file of this patent:

UNITED STATES PATENTS

| Number | Name | Date |
|---|---|---|
| 2,326,911 | Aikman | Aug. 17, 1943 |
| 2,404,951 | Donaldson | July 30, 1946 |
| 2,426,064 | Stevens | Aug. 19, 1947 |
| 2,444,273 | Stevens | June 29, 1948 |